US005544849A
United States Patent [19]
Peterson et al.

[11] Patent Number: 5,544,849
[45] Date of Patent: Aug. 13, 1996

[54] SWAGED WEAR SLEEVE AND METHOD

[75] Inventors: Ivan H. Peterson; James S. Hoelle, both of Hamilton; Neil F. Cunningham, Blanchester; Michael A. Umney, Mason, all of Ohio

[73] Assignee: General Electric Company, Cincinnati, Ohio

[21] Appl. No.: 334,309

[22] Filed: Nov. 4, 1994

[51] Int. Cl.⁶ ............................................. A47F 7/00
[52] U.S. Cl. ............................................. 248/74.1
[58] Field of Search ........................ 248/74.1, 68.1, 248/62, 74.2, 65

[56] References Cited

U.S. PATENT DOCUMENTS

| | | | |
|---|---|---|---|
| 3,565,374 | 2/1971 | Jones | 248/54 |
| 3,804,354 | 4/1974 | Weiss | 248/68.1 |
| 3,853,148 | 12/1974 | De Vincent et al. | 138/110 |
| 4,113,286 | 9/1978 | Kennedy | 248/62 X |
| 4,338,707 | 7/1982 | Byerly | 24/257 |
| 4,393,998 | 7/1983 | Allen | 248/74.1 |
| 4,714,229 | 12/1987 | Force | 248/74.2 X |
| 4,795,114 | 1/1989 | Usui et al. | 248/62 |
| 4,858,860 | 8/1989 | Richards | 248/62 |
| 4,915,125 | 4/1990 | Lester | 248/74.1 X |
| 5,009,376 | 4/1991 | Usui | 248/74.1 |
| 5,248,119 | 9/1993 | Imura | 248/65 |
| 5,390,882 | 2/1995 | Lee | 248/68.1 |

*Primary Examiner*—Alvin C. Chin-Shue
*Assistant Examiner*—Sarah L. Purol
*Attorney, Agent, or Firm*—Andrew C. Hess; Patrick R. Scanlon

[57] ABSTRACT

A tubular wear sleeve includes radially outer and inner surfaces, with the inner surface having at least one protuberance extending radially inwardly therefrom for being received in a complementary indentation in a fluid carrying tube for restraining relative movement therebetween.

11 Claims, 4 Drawing Sheets

SWAGED WEAR SLEEVE AND METHOD

The present invention relates generally to mounting of tubing systems in a gas turbine engine, and, more specifically, to a wear sleeve clamping arrangement of tubes subject to vibration.

BACKGROUND OF THE INVENTION

Aircraft gas turbine engines include various tubes for carrying bleed air, fuel, and oil for various purposes. In the bleed air system for example, suitable metal tubes such as Inco 625 tubes are used for carrying the relatively hot compressor bleed air to various parts of the engine. The tubes must be suitably mounted at spaced apart locations to stationary mounting supports, and configured for minimizing vibration thereof caused by excitation forces being generated in the operating engine.

In order to minimize vibratory friction wear between the bleed air tubes and their mounts, conventional wear sleeves are typically used and interposed between the outer circumference of the tube and the complementary clamp which rigidly secures the tube to its mounting support. A typical wear sleeve is tubular in configuration and may be fully annular in which case it is initially axially assembled over an open end of the tube, or may be formed in two semi-circular parts and assembled together around the tube. Conventional wear sleeves are typically brazed or welded to the parent tube, and in the case of Inco 625 tubes, the brazed alloy is either nickel or gold. Nickel is relatively brittle and gold is very expensive. Welding and brazing are both time consuming processes and require inspection after completion for ensuring adequacy of the assembly. Both processes also leave stress concentrations at the wear sleeve ends and horizontal split lines for example. Since the tube is mounted in a dynamic environment in the gas turbine engine, vibratory excitation forces generate stress at the wear sleeve support. This stress must be maintained suitably low in magnitude for obtaining a useful life of the tube.

SUMMARY OF THE INVENTION

A tubular wear sleeve includes radially outer and inner surfaces, with the inner surface having at least one protuberance extending radially inwardly therefrom for being received in a complementary indentation in a fluid carrying tube for restraining relative movement therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
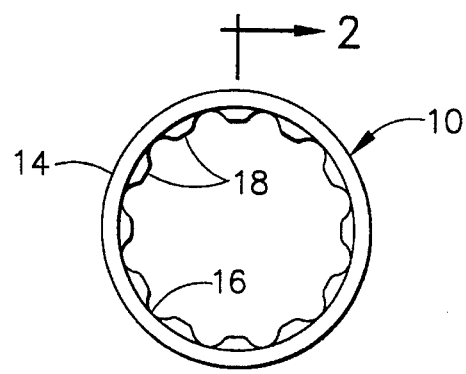
FIG. 1 is an end view of an exemplary wear sleeve in accordance with one embodiment of the present invention.
Figure 2:
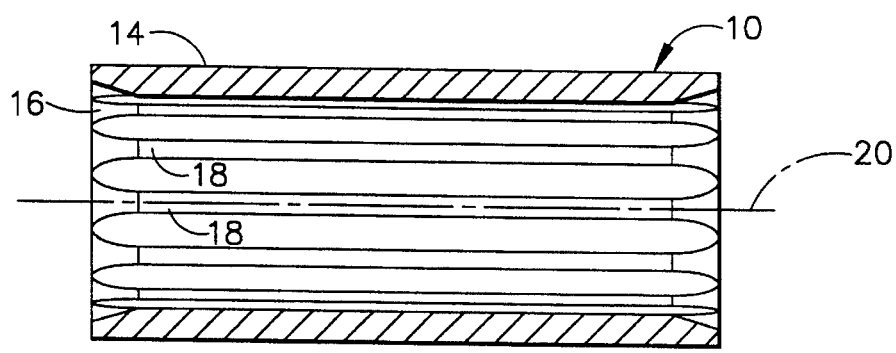
FIG. 2 is an axial sectional view through the wear sleeve illustrated in FIG. 1 and taken along line 2—2.
Figure 3:
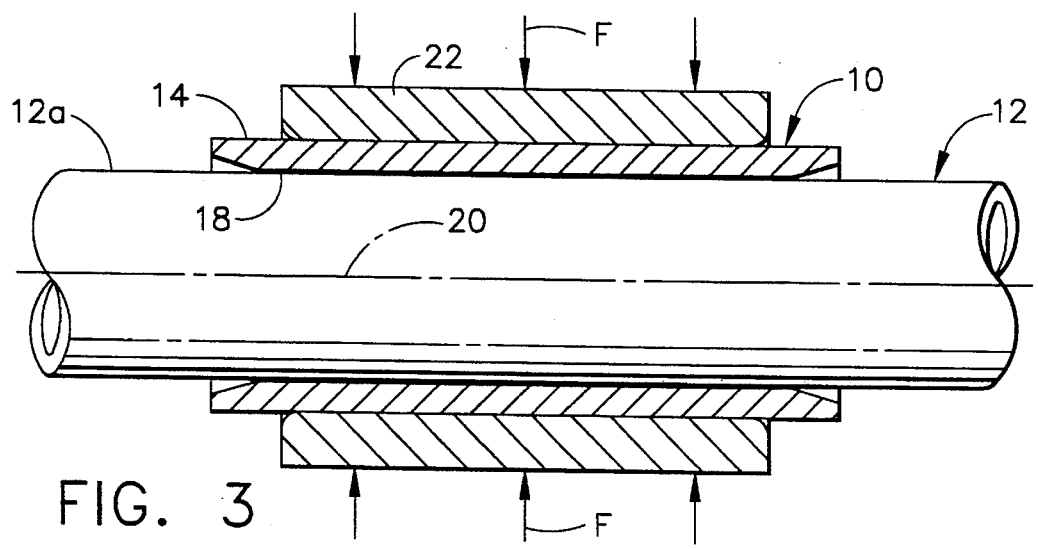
FIG. 3 is an axial section view of the wear sleeve illustrated in FIG. 2 mounted around a fluid carrying tube prior to being swaged thereon.

Illustrated in FIGS. 1 and 2 is a tubular wear sleeve 10 for use in supporting an exemplary fluid carrying tube 12 shown in FIG. 3 which is subject to vibration. The tube 12 is in the exemplary form of a bleed-air carrying tube for an aircraft gas turbine engine which is therefore subject to vibratory excitation forces during operation of the engine. The bleed air carried by the tube is typically hot, and the tube 12 is therefore made of a suitable material such as Inco 625 for providing suitable strength at the elevated temperatures involved.

As shown in FIGS. 1 and 2, the wear sleeve 10 includes a smooth radially outer surface 14, and a radially inner surface 16 having at least one protuberance 18 extending radially inwardly therefrom. Although a minimum of one protuberance 18 may be used, in the preferred embodiment illustrated in FIGS. 1 and 2, a plurality of protuberances 18 in the form of elongate ribs are circumferentially spaced apart from each other around an inner circumference of the inner surface 16 and extend parallel to an axial centerline axis 20 of the wear sleeve 10. The individual ribs 18 may be conventionally formed by broaching the inner surface 16 to form generally semi-circular valleys and ridges which define circumferentially adjacent ribs 18.

Figure 4:
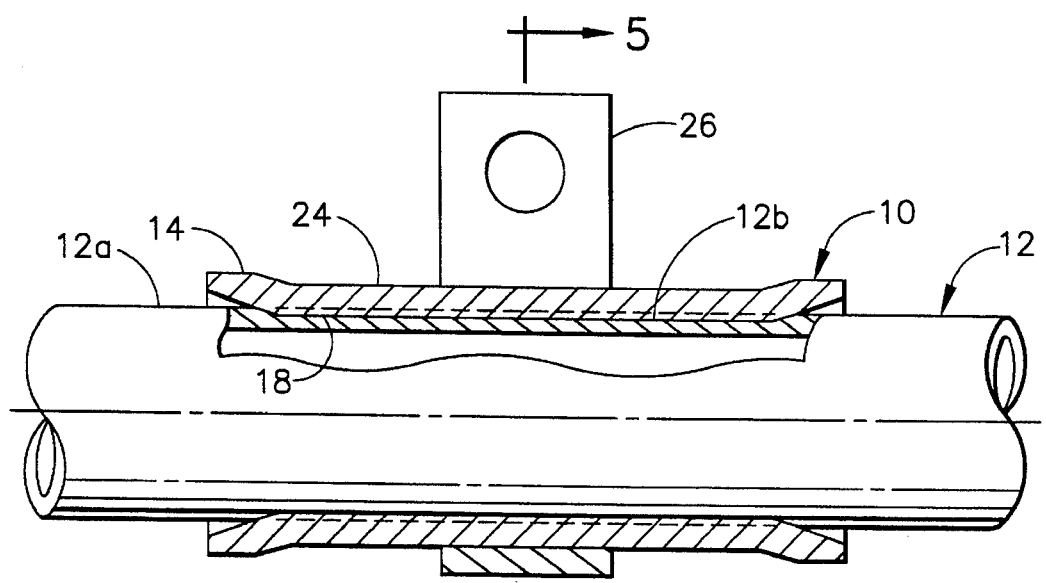
FIG. 4 is a partly sectional, axial view of the wear sleeve surrounding the tube illustrated in FIG. 3 after swaging thereof.
Figure 5:
FIG. 5 is a radial sectional view through the wear sleeve and tube and surrounding mounting clamp illustrated in FIG. 4 and taken along line 5—5.
Figure 5:
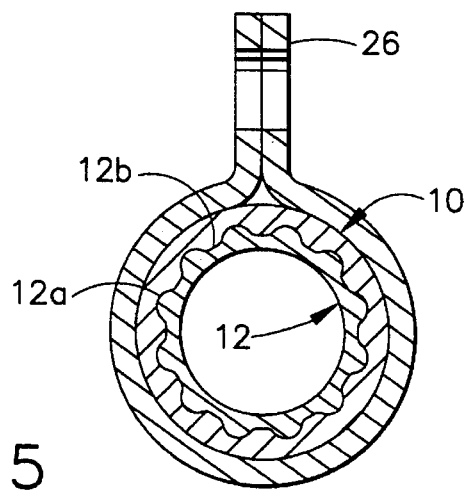

In order to join the wear sleeve 10 to the tube 12 without brazing or welding, the wear sleeve 10 is initially positioned around the tube 12 by being axially slid thereover from an unobstructed end of the tube 12. A conventional swaging or crimping anvil 22 is positioned around the wear sleeve 10 and is conventionally compressed inwardly with a suitable force F using a mechanical lever, hydraulic pump, or other means for swaging or crimping the outer surface 14 of the wear sleeve 10 for interlocking the ribs 18 with the flow tube 12. FIGS. 4 and 5 illustrate the wear sleeve 10 and the fluid tube 12 after the swaging operation. The fluid tube 12 has an outer surface 12a which is initially smooth as illustrated in FIG. 3 but upon swaging of the wear sleeve 10 to the tube outer surface 12a as illustrated in FIGS. 4 and 5, the ribs 18 are compressed into the tube outer surface 12a to plastically form complementary indentations 12b for mechanically restraining relative movement both axially and circumferentially between the wear sleeve 10 and the fluid tube 12.

The wear sleeve 10 is preferably formed of the same material as the parent tube 12, which in this exemplary case is Inco 625, so that they both have the same coefficient of thermal expansion and therefore expand and contract together under temperature changes to maintain a tight interference fit. In the exemplary embodiment illustrated in FIG. 3, the axial length of the anvil 22 is slightly less than the axial length of the wear sleeve 10 so that after swaging of the wear sleeve 10, a corresponding swaged or crimped depression 24 remains in the outer surface 14 of the wear sleeve 10 as illustrated in FIG. 4. The swaging operation therefore compresses the ribs 18 under the depression 24 to plastically form the complementary indentations 12b which mechanically interlock with the ribs 18. The diameter of the wear sleeve 10 in the depression 24 is accordingly reduced, with the inner diameter of the ribs 18 having a resultant value less than the nominal outer diameter of the tube 12 in the region of the interlocking ribs 18 and complementary indentations 12b. The corresponding joints formed thereat are solely mechanical joints which restrain relative movement between the wear sleeve 10 and the tube 12 by primarily shear force, and secondarily by friction force. The wear sleeve 10 is therefore securely joined around the tube 12 without brazing or welding thusly providing a substantial improvement in the assembly process. The corresponding transverse sections of the ribs 18 and indentations 12b preferably have suitable radii for minimizing the stress concentrations thereat.

After the wear sleeve 10 is crimped around the tube 12, a conventional band clamp 26, as shown in FIGS. 4 and 5, is positioned around the wear sleeve 10 for being suitably fastened to the mounting support in the gas turbine engine. Alternatively, the band clamp 26 may be used for supporting other components to the tube 12, such as a wiring harness if desired.

The wear sleeve 10 illustrated in FIGS. 1–5 is preferably in the form of a single or unitary tubular part having circumferential hoop stress carrying capability. It therefore must be suitably initially positioned over the tube 12 from an unobstructed end thereof.

Figure 6:
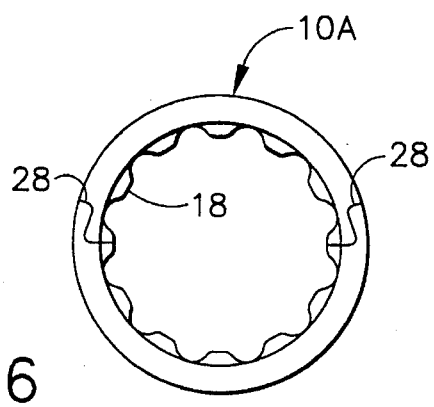
FIG. 6 is an end view of a wear sleeve in accordance with another embodiment of the present invention having two interlocking horizontal split lines therein.

FIG. 6 illustrates an alternate embodiment of the wear sleeve designated 10A which includes a pair of horizontal split lines 28 disposed on opposite sides thereof which allow assembly of the wear sleeve 10A by assembling separate 180° halves or parts around the fluid tube 12. As shown in FIG. 6, the split lines 28 are generally S-shaped in transverse section for circumferentially interlocking together the two parts of the wear sleeve 10A.

Figure 7:
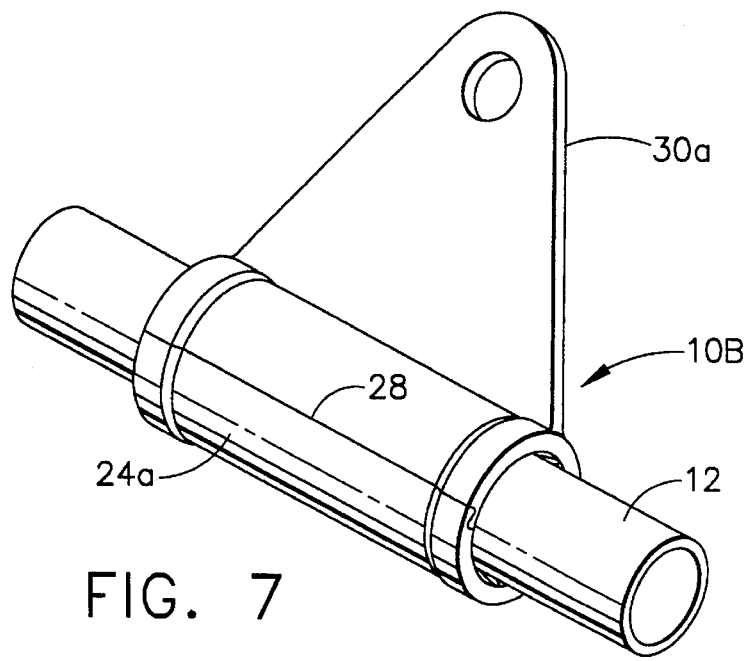
FIG. 7 is a perspective view of another embodiment of a horizontally split wear sleeve having an integral full width tab extending radially outwardly therefrom.
Figure 8:
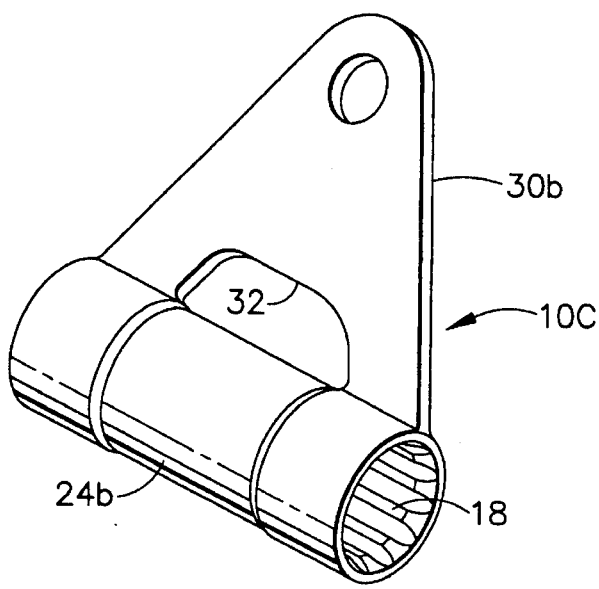
FIG. 8 is a perspective view of another embodiment of a tubular wear sleeve having an integral tab extending therefrom with a central access hole therebetween.
Figure 9:
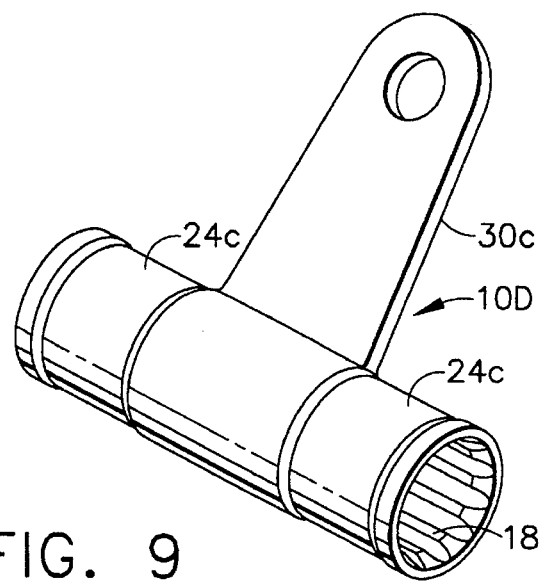
FIG. 9 is a perspective view of a wear sleeve in accordance with another embodiment of the present invention having a part-width tab extending therefrom.

Illustrated in FIGS. 7–9 are three additional embodiments of the wear sleeve designated 10B, 10C, and 10D, with each having a respective integral tab 30a,b,c extending radially outwardly from the outer surface thereof. In this case the separate band clamp 26 shown in FIGS. 4 and 5 is not required, with the integral tab 30a–c being used for mounting the wear sleeves 10B–C and attendant tubes 12 to the mounting support in the gas turbine engine. In the wear sleeve 10B illustrated in FIG. 7, the tab 30a extends the full length of the wear sleeve 10B at its base and tapers or converges in width at its tip end. The corresponding depression 24a extends for substantially the full length of the wear sleeve 10B except at the base of the tab 30a. Also in this embodiment, the two horizontal split lines 28 may be used if desired.

In FIG. 8, the tab 30b also extends the full length of the wear sleeve 10C except it further includes a central aperture 32 forming two legs integrally joined to the wear sleeve 10C at opposite ends thereof. In this embodiment, the depression 24b completely surrounds the wear sleeve 10C within the axial extent of the aperture 32 which is provided for receiving a portion of the swaging anvil therethrough.

In the FIG. 9 embodiment, the tab 30c is a part-width tab joined at its base to only the central region of the wear sleeve 10D leaving exposed the two axially opposite ends thereof. The wear sleeve 10D is therefore swaged around its full perimeter at both axially opposite ends for forming two substantially identical part length depressions 24c thereat.

In all three embodiments illustrated in FIGS. 7–9, the integral tabs 30a–c increase the torque carrying capability between the wear sleeve 10B–D and the respective tubes 12. However, by providing the axially elongate ribs 18 over the entire inner surfaces of the wear sleeves 10B–D, a substantial amount of reaction force may be generated between the interlocked wear sleeves and tube 12 for effectively maintaining the components together for a useful lifetime.

Figure 10:
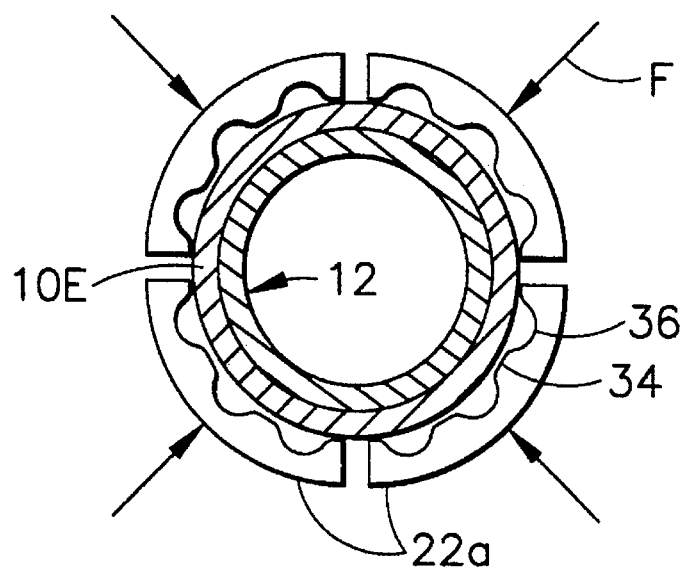
FIG. 10 is a schematic, radial sectional view of an initially smooth wear sleeve surrounding an initially smooth tube with exemplary swaging anvils having ribs therein.
Figure 11:
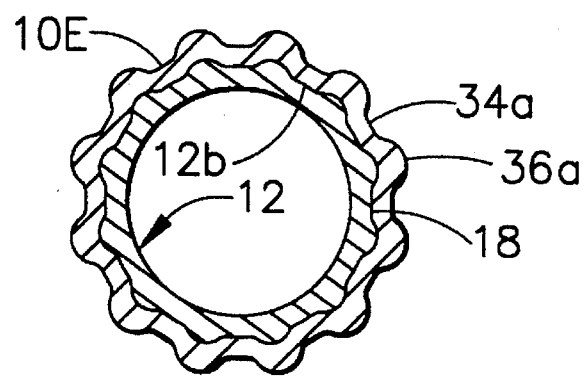
FIG. 11 is a radial sectional view of the wear sleeve and tube illustrated in FIG. 10 after swaging thereof to form interlocking joints therebetween.

Illustrated in FIGS. 10 and 11 is yet another embodiment of the present invention wherein the wear sleeve 10E is initially a cylinder having smooth outer and inner surfaces. The anvils 22a in this embodiment include suitable ridges 34 and grooves 36 which face the outer surface of the wear sleeve 10E. Upon conventional application of suitable compression force F on the anvils 22a, the wear sleeve ribs 18 and complementary tube indentations 12b may be plastically formed for interlocking together these components. The anvil ridges and grooves 34, 36 form complementary grooves and ridges 34a, 36a in the outer surface of the wear sleeve 10E after the swaging process.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A tubular wear sleeve for surrounding a fluid carrying tube subject to vibration comprising a radially outer surface and a radially inner surface, said inner surface having at least one protuberance extending radially inwardly therefrom for being received in a complementary indentation in said fluid tube for restraining relative movement between said wear sleeve and said fluid tube.

2. A wear sleeve according to claim 1 wherein said protuberance comprises an elongate rib extending parallel to an axial centerline axis of said wear sleeve.

3. A wear sleeve according to claim 2 further comprising a plurality of said ribs circumferentially spaced apart from each other around an inner circumference of said inner surface.

4. A wear sleeve according to claim 3 further comprising a pair of horizontal split lines disposed on opposite sides thereof allowing assembly of said wear sleeve in two separate parts around said fluid tube.

5. A wear sleeve according to claim 4 wherein said split lines are configured for interlocking together said wear sleeve two parts.

6. A wear sleeve according to claim 3 comprising a unitary tubular form having circumferential hoop stress carrying capability.

7. A wear sleeve according to claim 6 in combination with said fluid tube, with said wear sleeve outer surface having a swaged depression for interlocking said ribs in complementary ones of said fluid tube indentations.

8. A combination according to claim 7 further comprising an integral tab extending radially outwardly from said wear sleeve outer surface.

9. A method of joining a tubular wear sleeve around a fluid carrying tube comprising:

positioning said wear sleeve around said tube; and swaging an outer surface of said wear sleeve for interlocking a protuberance extending radially inwardly from an inner surface of said wear sleeve with a complementary indentation disposed in an outer surface of said fluid tube.

10. A method according to claim 9 wherein:

said wear sleeve initially includes a plurality of circumferentially spaced apart ones of said protuberances comprising elongate axial ribs;

said fluid tube outer surface is initially smooth; and said swaging step compresses said ribs into said tube outer surface to plastically form complementary indentations for mechanically restraining relative movement between said wear sleeve and said fluid tube.

11. In combination, a fluid carrying tube and a tubular wear sleeve surrounding said fluid carrying tube, said fluid carrying tube having at least one indentation therein and said tubular wear sleeve having a radially outer surface and a radially inner surface, said inner surface having at least one protuberance extending radially inwardly therefrom for being received in said indentation for restraining relative movement between said wear sleeve and said fluid carrying tube.

* * * * *